United States Patent [19]

Foote

[11] 3,944,098

[45] Mar. 16, 1976

[54] FRONT LOADING AND EJECTING WASTE REMOVAL VEHICLE

[75] Inventor: Alfred F. Foote, Phoenix, Ariz.

[73] Assignee: C.F.K. Engineering Company, Phoenix, Ariz.

[22] Filed: Mar. 8, 1973

[21] Appl. No.: 339,291

[52] U.S. Cl. ............... 214/519; 180/89 R; 198/7 R; 214/83.32

[51] Int. Cl.² ............................................ B60P 1/00

[58] Field of Search ....... 214/83.3, 83.32, 518, 519, 214/520; 180/89 R; 198/7 BL; 56/362

[56] References Cited

UNITED STATES PATENTS

| | | | |
|---|---|---|---|
| 785,957 | 3/1905 | Kent | 56/362 |
| 1,889,562 | 11/1932 | Moulthrop | 214/83.32 |
| 2,660,326 | 11/1953 | Calamore | 214/503 |
| 3,059,791 | 10/1962 | Stratton | 214/83.32 |
| 3,233,765 | 2/1966 | Barnes | 214/500 |
| 3,499,558 | 3/1970 | Rey | 214/83.3 |
| 3,750,900 | 8/1973 | Piercey | 214/520 |
| 3,769,988 | 11/1973 | Burenga | 214/83.32 |

FOREIGN PATENTS OR APPLICATIONS

| | | | |
|---|---|---|---|
| 1,211,213 | 11/1970 | United Kingdom | 56/362 |

*Primary Examiner*—Robert J. Spar
*Assistant Examiner*—Donald W. Underwood
*Attorney, Agent, or Firm*—Cahill, Sutton & Thomas

[57] ABSTRACT

A solid waste removal vehicle having a front loading mechanism for collecting, comminuting and compacting waste while being transferred into a container. The vehicle is further characterized by a driver cab and a loading assembly normally positioned in the path of ejection of the waste from the container, the cab and assembly each being independently swingable transversely of the path to an offset and unobstructing position to satisfy loading and ejecting conditions. A mechanism responsive to the swing of the cab automatically maintains the latter in its normal forward-facing position at all times to thereby provide optimum visibility for the driver or operator. Moreover, means are provided for steering the vehicle during normal and offset positions of the cab.

6 Claims, 19 Drawing Figures

FRONT LOADING AND EJECTING WASTE REMOVAL VEHICLE

This invention relates to material handling apparatus and more particularly to a mechanical system constructed and arranged to efficiently pick up, transfer and compact into a container a wide variety of materials ranging from loose or bagged trash to relatively large objects such as white goods, old stoves and refrigerators. The system is especially suitable for use on waste and garbage removal trucks, but is not so limited inasmuch as many other practical applications are feasible.

It is an object of this invention to provide an improved feeding mechanism for solid waste removal vehicles wherein the waste is comminuted, condensed, funneled and compacted into a container by a pair of longitudinally disposed convergent conveyors, one of which is yieldably mounted for transverse movement toward and away from the other.

Preferably, at least one of the convergent conveyors should be a screw or auger type adapted to tear, shred and comminute the waste pressed thereagainst by the opposing conveyor; however, other applications may require both conveyors to be a screw or auger type. By yieldably mounting one of the convergent conveyors, a spread will be produced by the engagement of relatively large waste objects which have not been sufficiently broken up by the screw conveyor, thus allowing such objects to pass into the container.

Another object of this invention is to provide a feeding mechanism of the class described, in combination with means positioned at the apex of the respective conveyor thrusts for yieldingly resisting the resultant thrust while further comminuting the waste. This further comminution permits condensation of the waste into a still smaller volume as it enters the container.

A further object of invention is to provide a waste removal vehicle having the above-mentioned improved feeding mechanism mounted on the front end thereof, in combination with a vertically swingable pickup conveyor for lifting piled waste and transferring it rearwardly to the feeding mechanism.

It is another object of this invention to provide a front loading and ejecting waste removal vehicle having a driver cab normally positioned in the ejection path of the waste, in combination with means for swinging the cab transversely to an offset position concurrently with maintaining the cab in its normal forward-facing position.

Yet another object of invention is to maintain a normal operative steering connection between the vehicle and the cab as the latter assumes various offset positions.

Some of the objects of the invention having been stated, other objects will appear as the description proceeds when taken in connection with the accompanying drawings, in which, FIG. 1 is a side elevation of a vehicle, with parts shown in section, depicting my improved loading and ejecting apparatus;

A better understanding of the invention will result from perceiving how the elements are incorporated in a garbage truck as described in detail below.

Referring more particularly to the drawings, the numeral 10 denotes an automotive vehicle having a chassis 11 and a rear compartment 12 in which the engine and certain of the accessories (not shown) are located. An elongated container 14 is mounted upon chassis 11 and disposed longitudinally of the vehicle, said container adapted to receive waste or other material deposited therein by means of my improved loading apparatus.

Figure 1:
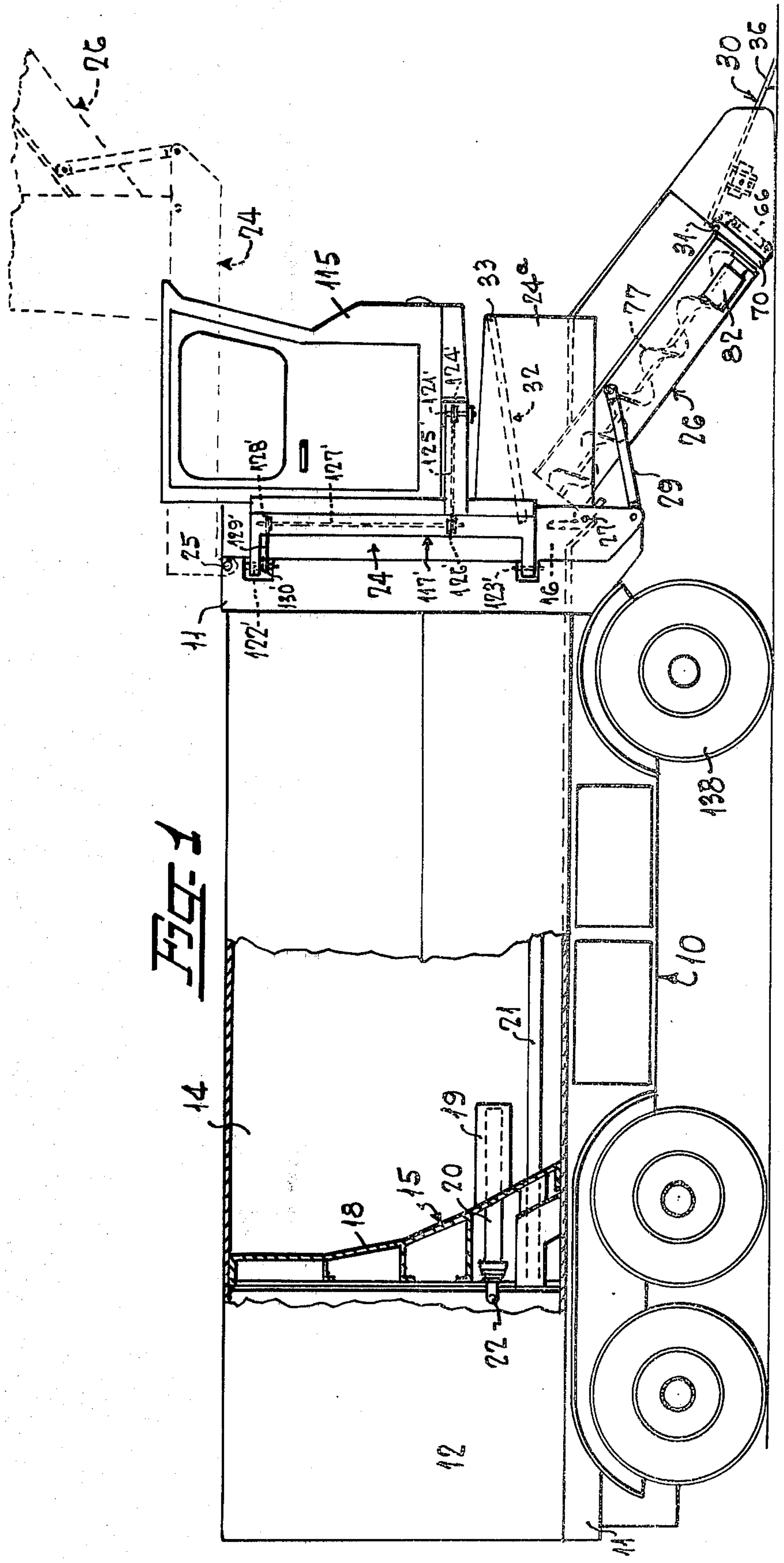
Figure 2:
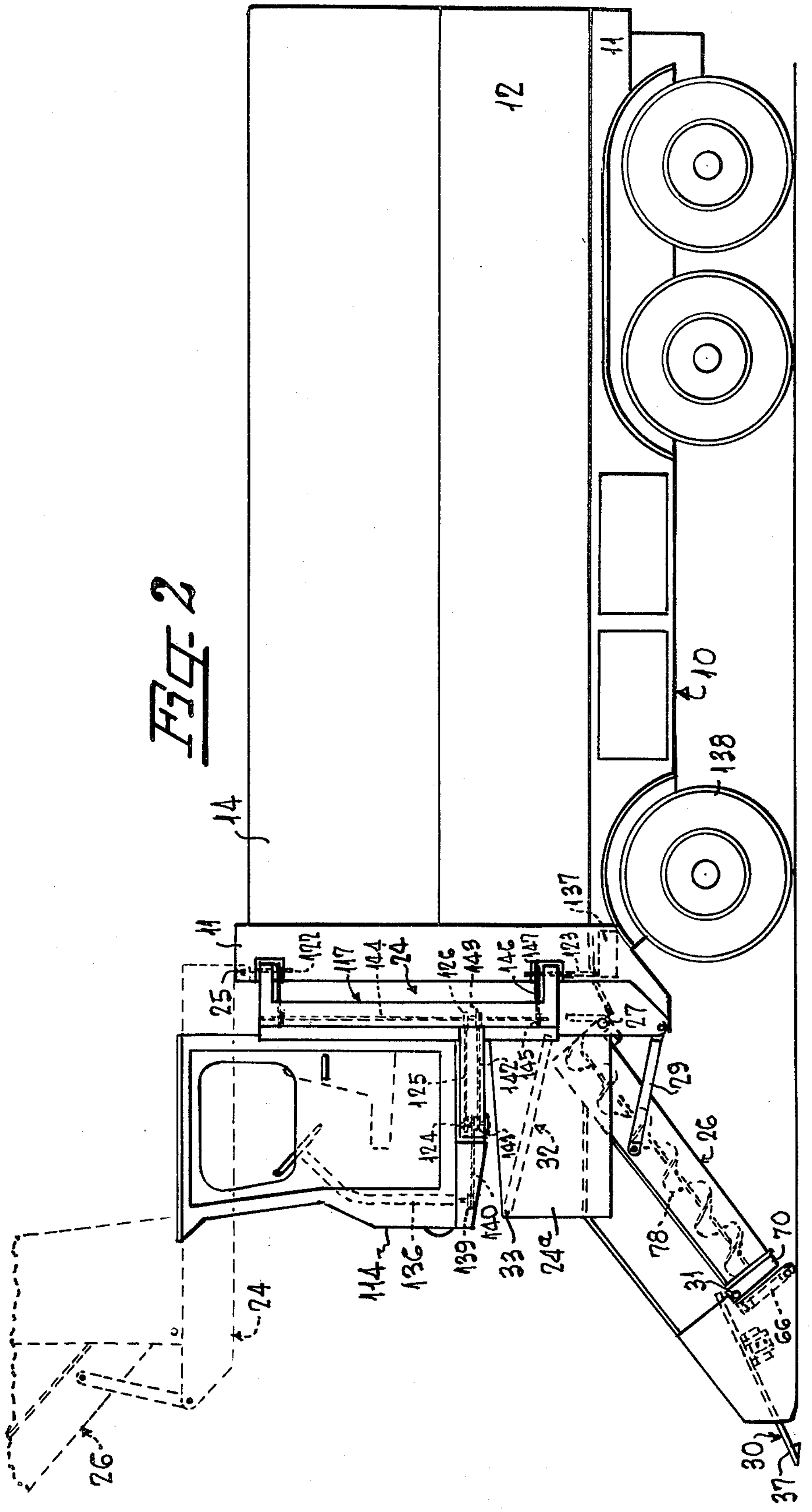
FIG. 2 is an elevation of the opposite side of FIG. 1.
Figure 6:
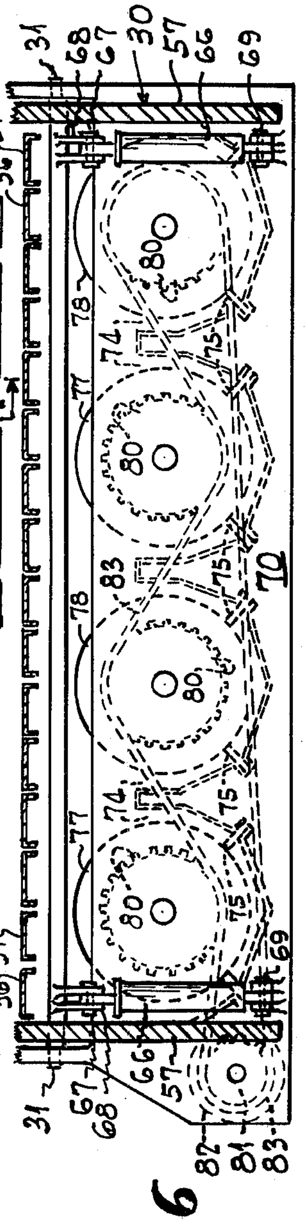
FIG. 6 is a transverse sectional view taken along line 6—6 in FIG. 3, showing the driving means for the screw conveyor unit.

A suitable ejector assembly, such as shown in the Ferrari U.S. Pat. No. 3,229,882, is disposed inside container 14 and adapted to discharge the deposited waste therefrom through front opening 16 (FIGS. 1, 2 and 6). This assembly consists of an ejector plate 18 slidably mounted upon longitudinally disposed guide rod 21, in combination with a plurality of telescoping cylinders 20 having one end thereof pivoted at stationary point 22 and its other end extending within housing 19 integral with the ejector plate 18. In order to advance the ejector plate forwardly, hydraulic fluid pressure is introduced into the retracted telescoped cylinders as shown in FIG. 1 to cause them to elongate in a well-known manner.

Briefly stated, the front loading apparatus according to the invention comprises: a closure frame unit 24 adapted to cover the upper portion of front opening 16, said unit being pivotally supported as at 25 to the upper portion of chassis 11; a ramp-type screw conveyor unit 26 having its upper end pivotally supported as at 27 to the lower free end portion of unit 24; an inclined interfingered pickup unit 30 having its upper end pivotally supported as at 31 by the lower free end of screw conveyor unit 26; and an inverted interfingered conveyor unit 32 having its forward end pivotally supported as at 33 between laterally spaced side plates 24*a* of unit 24 and its rearward free end swingable toward and away from screw conveyor unit 26 disposed therebelow. It will be noted in FIG. 3 that the units 24, 26, 30 and 32 are each independently swingable vertically about a horizontal axis. In other words, unit 30 is swingable about pivot 31 through arc 31*a;* unit 26 and the attached unit 30 are swingable about pivot 27 through arc 27*a;* unit 24 and the attached units 26 and 30 are swingable about pivot 25 through arc 25*a;* and unit 32 is swingable about pivot 33 through arc 33*a*.

Figures 7, 8, 9, 10:
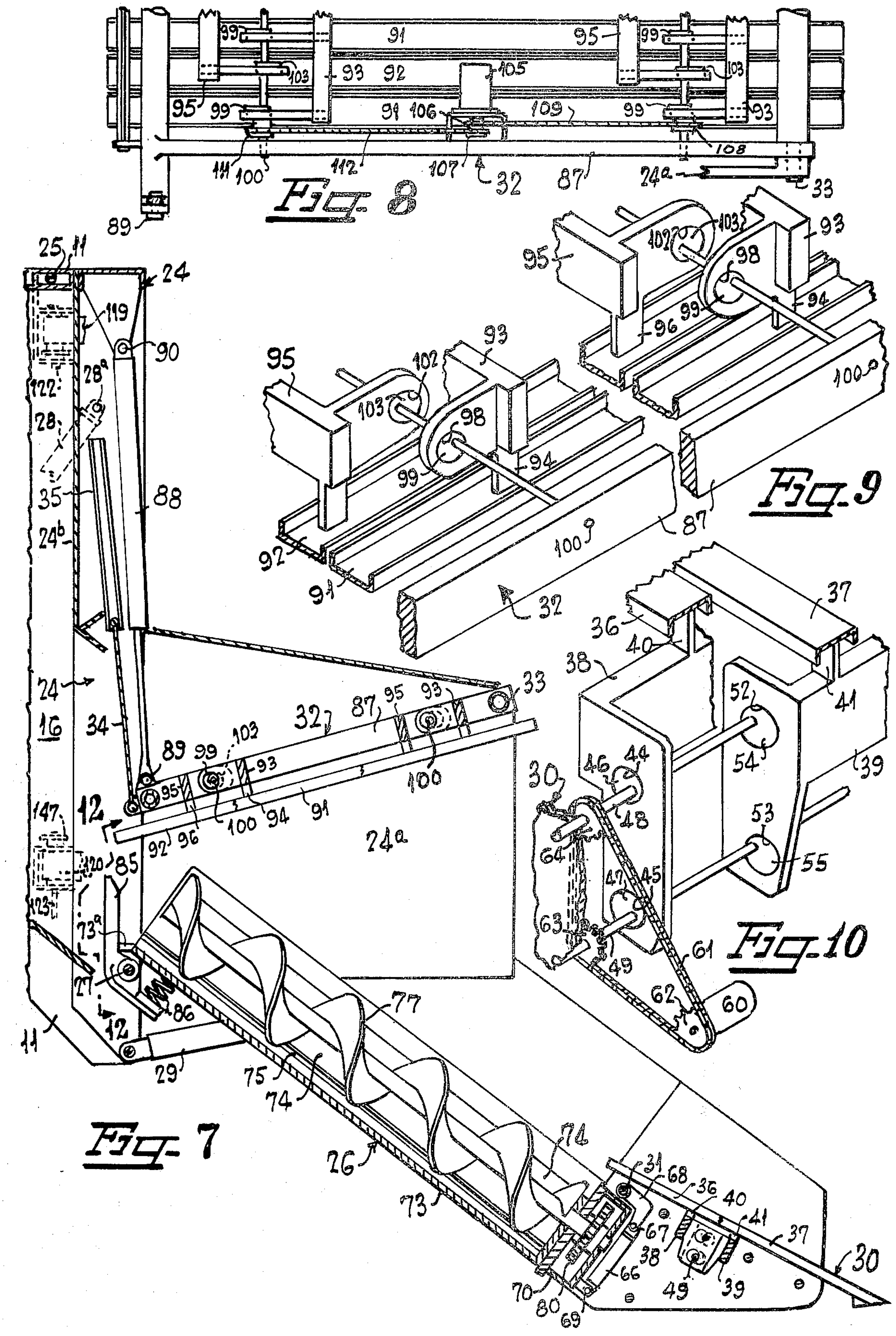
FIG. 7 is an enlarged longitudinal sectional view through the loading assembly and taken along line 7—7 in FIG. 5.
FIG. 8 is a fragmentary top plan view taken along line 8—8 in FIG. 3, showing a portion of the convergent interfingered conveyor.
FIG. 9 is a fragmentary isometric view showing the actuating mechanism for the convergent interfingered conveyor.
FIG. 10 is a fragmentary isometric view showing the driving mechanism for the pickup interfingered conveyor unit.

The pickup unit 30 comprises a plurality of alternately spaced channels or fingers 36 and 37 (FIGS. 5, 6, 7, 10 and 11) rigidly mounted on transverse bars 38 and 39 by plates 40 and 41 respectively. Thus, all of the fingers 36 are rigidly secured to bar 38 and all of the fingers 37 are rigidly secured to bar 39. Each end of bar 38 is supported by a pair of eccentric bearings 44 and 45 having eccentrics 46 and 47 rotatably mounted therein and fixedly secured on shafts 48 and 49 respectively (FIGS. 7 and 10). Similarly, each end of bar 39 is supported by a pair of eccentric bearings 52 and 53 having eccentrics 54 and 55 rotatably mounted therein and also fixedly secured on shafts 48 and 49 respectively, said shafts 48 and 49 being journalled in side plates 57 rigidly secured to the pivot shaft 31 (FIG. 6). Shafts 48 and 49 are driven in the same direction and at the same rate by a motor 60 through chain 61 on sprockets 62, 63 and 64 (FIG. 10).

It is important to note that the high points of eccentrics 46 and 47 are positioned on shafts 48 and 49 diametrically opposite the high points of eccentrics 54 and 55 respectively. By this arrangement of the eccentrics, the rotation of shafts 48 and 49 will cause bar 38 and the associated fingers 36 to bodily rotate and oscillate 180° out-of-phase with the bar 39 and its associated channels 37. When collecting waste, the out-of-phase rotation causes the lower ends of fingers 36 and 37 to successively and alternately pass underneath the waste, lift it upwardly and transfer it rearwardly, thereby continuously conveying the waste toward the screw conveyor 26. The circular motion of the fingers also eliminates sliding action on the objects being transferred. Furthermore, by oscillating the two sets of fingers 36 and 37 about the same pair of shaft centers, a more rugged and simple construction is provided.

Figure 3:
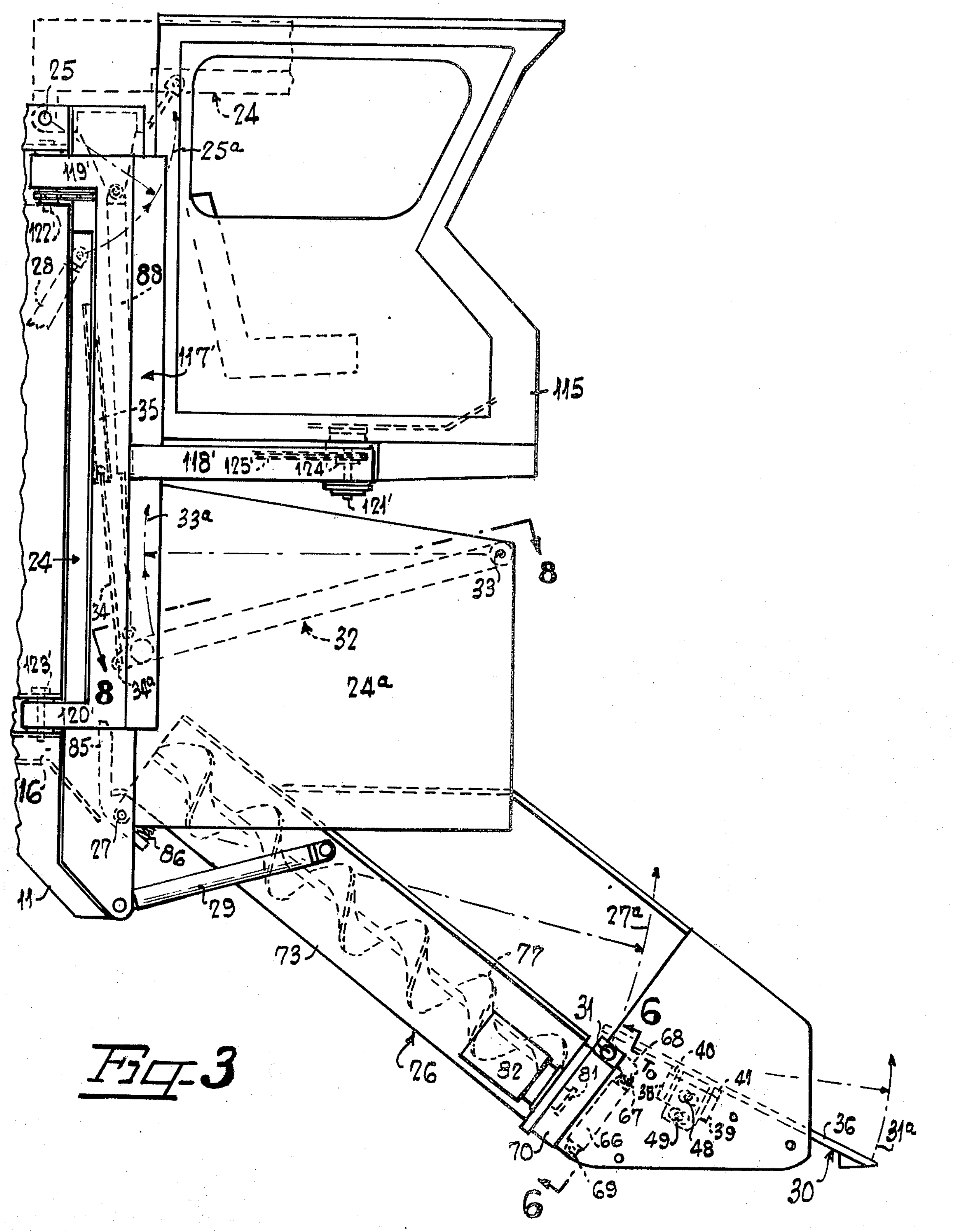
FIG. 3 is an enlarged elevational view of the right-hand portion of FIG. 1, showing details of the loading assembly.
Figure 5:
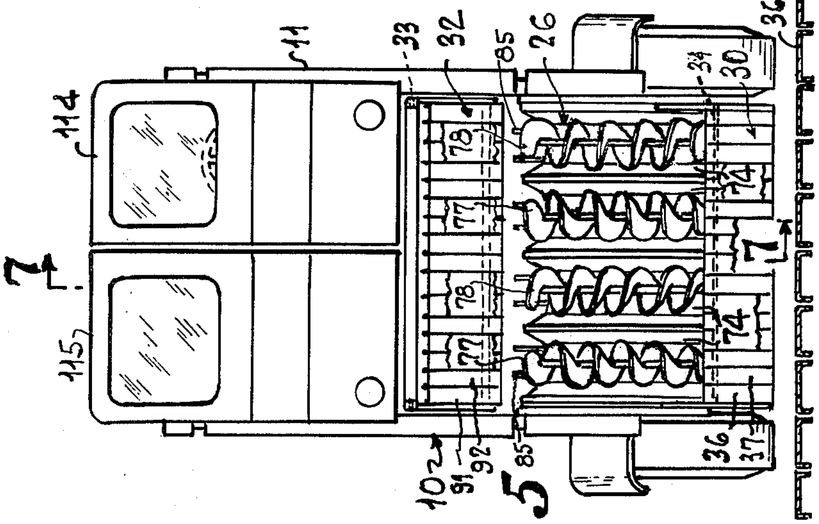
FIG. 5 is a front elevation of the vehicle, showing the conveyor components of the loading assembly, namely, an interfingered pickup unit, a convergent screw conveyor unit for receiving waste from the pickup unit, and a convergent interfingered conveyor disposed above the screw conveyor unit.
Figure 4:
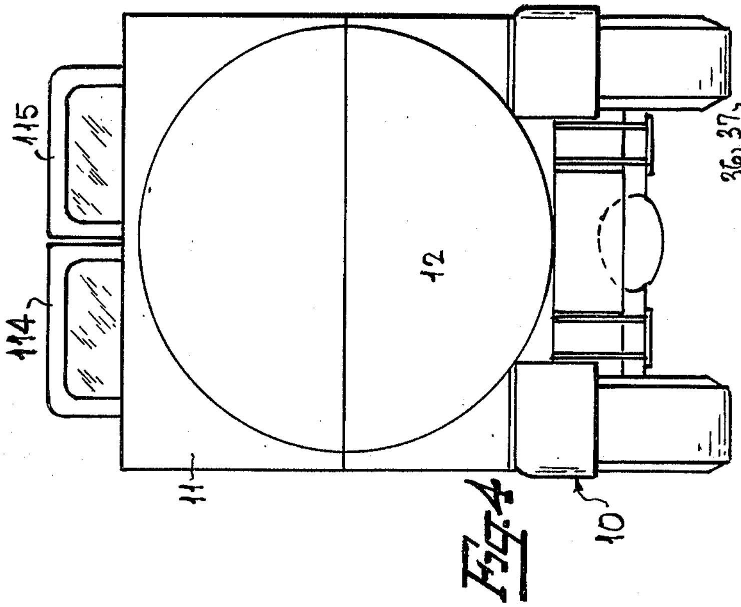
FIG. 4 is a rear elevation of the vehicle.

The vertical swinging movement of pickup conveyor 30 may be effected by any suitable means such as hydraulic rams 66 (FIGS. 3, 6 and 7). Each ram 66 has its upper end pivotally secured as at 67 to a lever 68 integral with pivot shaft 31 and its lower end pivotally secured as at 69 to a transverse elongated gear box 70 of screw conveyor unit 26.

The unit 26 comprises a ramp 73 which is longitudinally alined with and positioned between the container opening 16 and the pickup unit 30, the upper end of said ramp being hinged as at 27 to the lower portion of closure frame unit 24 and its lower end rigidly connected to the transverse gear box 70 (FIGS. 3, 5–7 and 12). The bottom area of ramp 73 has four parallel longitudinally disposed troughs 74 formed therein, the concave surface of each trough having a pair of longitudinally extending wear plates 75 which project upwardly about 1 inch and on which screws 77 and 78 bear while rotating. During rotation, the screws react against the loose smaller particles of waste material to cause the latter to be transferred upwardly of the troughs 74. It will be noted that screws 77 and 78 are rotatably mounted and driven at their lower ends while the upper ends are unattached. Of course, the upper ends of the screws may also be rotatably mounted in bearings located in the troughs, provided such bearings are sufficiently narrow or streamlined to offer no substantial blockage to the discharge of the material from the troughs. The lower ends of the screws 77 and 78 are rotatably mounted in gear box housing 70 (FIGS. 6 and 7), the lower end of each screw having a gear secured thereon, said gears and their respective screws being driven from a gear 81 of hydraulic motor 82 by means of a belt or chain 83.

Screws 77 and 78 are oppositely pitched and alternately positioned in the four troughs 74. By observing FIG. 6, it is apparent that the belt or chain 83 is mounted upon gears 80 so that the screws 77 and 78 will rotate in opposite directions. Thus, when the upper peripheries of a pair of oppositely pitched screws are rotated toward one another, a centering effect will be produced upon the material as it moves longitudinally up the conveyor 26.

Figure 12:
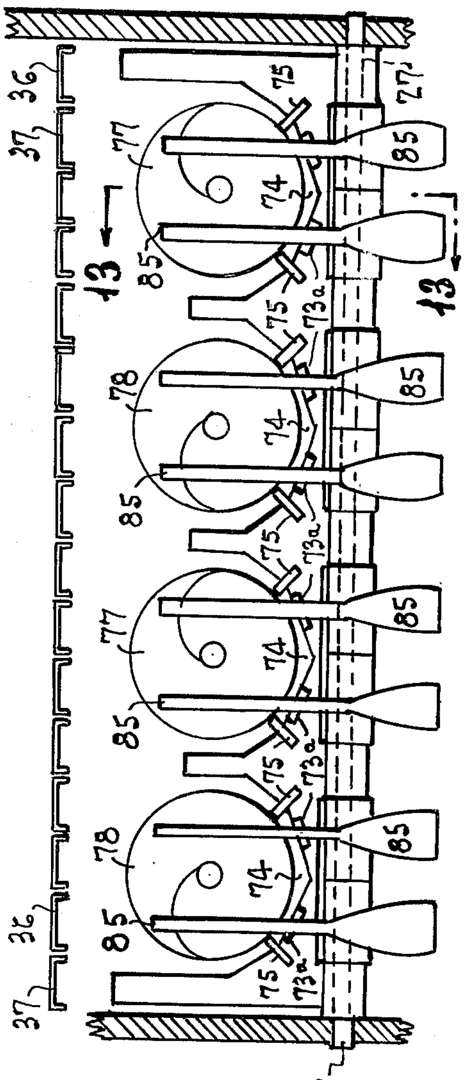
FIG. 12 is a transverse sectional view taken along line 12—12 in FIG. 7, showing the waste breaker bars at the discharge end of the screw conveyor unit.
Figure 11:
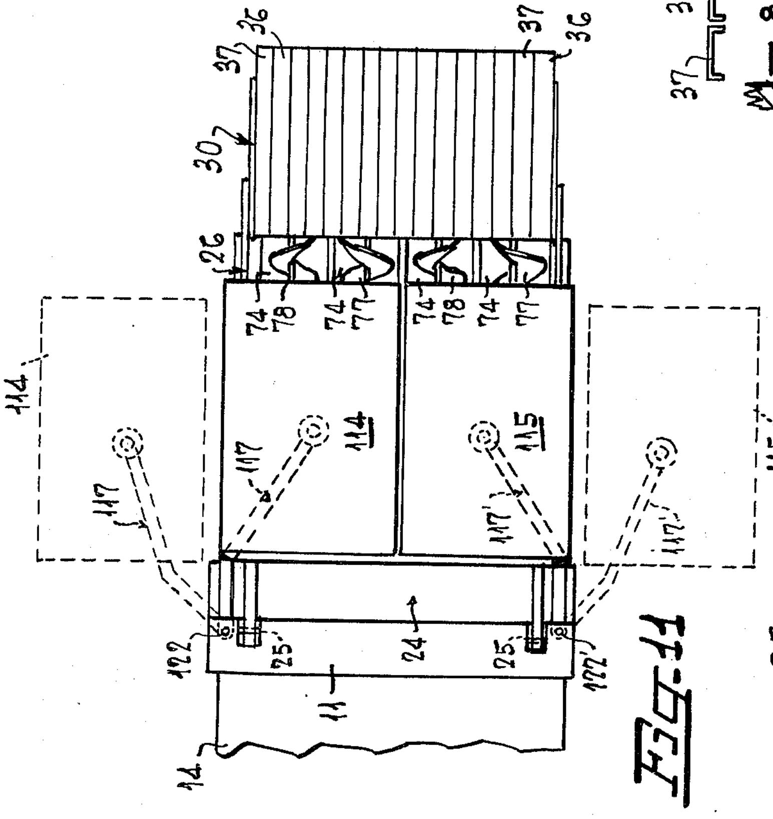
FIG. 11 is a plan view of the front portion of the vehicle, showing the driver and helper cabs each in its normal bold-line position and in its dotted-line offset position.
Figure 13:
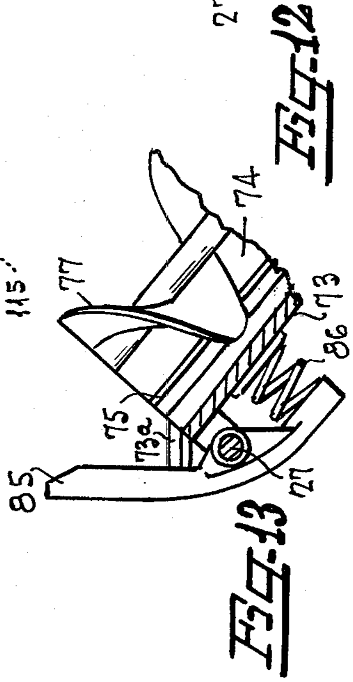
FIG. 13 is a sectional view taken along line 13—13 in FIG. 12.

In FIGS. 12 and 13, it will be noted that suitable spring loaded breaker bars 85 are located in the waste discharge path of each of the screws 77 and 78. These bars are positioned at an obtuse angle with respect to the plane of discharge of the screws so that very solid and difficult-to-shred material may pass thereover concurrently with the yielding movement of the bars as described below.

More specifically, each bar 85 is pivotally mounted intermediate its ends on the screw conveyor hinge shaft 27, the upper end portion of the bar being yieldingly held against a stop 73*a* integral with the ramp 73 by means of a compression spring 86 positioned between the lower end of the bar and the ramp bottom. When the discharging material exerts excessive pressure, the upper ends of bars 85 will yield under spring tension to permit passage. At the same time, these bars further comminute the waste under the upwardly acting compaction force of the converging conveyor units 26 and 32.

The inverted interfingered conveyor unit 32 operates on the same principle as the previously described pickup conveyor unit 30, but is constructed so as to yieldingly condense and compress the waste into engagement with the screws 77 and 78 at the discharge point where the above-described breaker bars 85 function (FIGS. 7, 8 and 9). More particularly, the unit 32 comprises a frame 87 having its forward end mounted on the previously mentioned pivot 33 and its rearward end swingable vertically toward and away from the discharge end portions of screws 77 and 78. Moreover, the rearward ends of units 26 and 32 converge to form a restricted passageway substantially coinciding with the lower portion of container opening 16, said passageway adapted to vary in size in response to the combined upward thrust of the units 26 and 32. In order to permit such size variation of the discharge opening, suitable hydraulic springs 88 are disposed between the pivot 89 on the free end of unit 32 and pivot 90 on the closure frame unit 24. When abnormally large solid unbroken objects reach the convergent end portions of the conveyor units, the springs 88 will yield to permit passage into the container opening 16.

Alternately spaced channels or fingers 91 and 92 are provided in unit 32 and are driven to alternately rotate and oscillate and exert a resultant stress toward the discharge opening and the breaker bars 85. All of the fingers 91 are rigidly mounted upon transverse bars 93, 93 by plates 94; and all of the fingers 92 are rigidly mounted on transverse bars 95, 95 by plates 96 (FIG. 9). The two bars 93 and associated fingers 91 are supported at their forward and rearward end portions respectively by a pair of bearings 98 in which a pair of eccentrics 99 are journalled, said eccentrics being fixedly secured upon spaced shafts 100, 100 respectively, which in turn, are rotatably mounted in frame 87.

In a similar manner, the two transverse bars 95 and their associated fingers 92 are supported by a pair of bearings 102 in which a pair of eccentrics 103 are respectively journalled, the latter being fixedly mounted upon the previously described shafts 100.

Since the high sides of eccentrics 99 and 103 are positioned diametrically opposite one another on each of the shafts 100, the simultaneous rotation of the shafts in the proper direction will cause the fingers 91 and 92 to bodily rotate and oscillate 180° out-of-phase to alternately compress and advance the waste material toward the discharge ends of units 26 and 32.

Shafts 100 are driven at the same rate and direction by a hydraulic motor 105, the shaft of said motor being provided with drive sprockets 106 and 107 (FIG. 8). Sprocket 106 drives a sprocket 108 on the forwardly positioned shaft 100 by means of a chain 109, while the sprocket 107 drives a sprocket 111 on the rearwardly positioned shaft 100 by means of a chain 112. As previously stated, the inverted interfingered conveyor unit 32 supplements the upward thrust of screw conveyor 26 while compressing the material into screws 77 and 78 which, in turn, tear and cut it into finer objects. In addition, both conveyors converge, compress and funnel the material against breaker bars 85 where further commination occurs.

In garbage truck applications, the pickup, screw and inverted conveyor units 26, 30 and 32 are preferably mounted on the front end of the truck having suitable driver and helper cabs 114 and 115 positioned above them. This arrangement is especially good for visibility and safe operation. Hence, the driver can move the truck to pick up a pile of rubbish at the speed he perceives to be optimum, and at all times see clearly any obstructions or hazards involving workmen and any other persons. This gives automatically a safer operation than is possible with any rear loading system. By mounting cabs 114 and 115 on appropriate supports, they may be moved laterally to clear the front end of the truck as shown in dotted lines in FIG. 11, after which the closure frame unit 24 and attached units 26 and 30 may be swung upwardly about pivots 25 to the dotted-line position shown in FIGS. 1 and 2 to completely uncover the front container opening 16, whereby the compacted contents in the container may be discharged by the above-described ejector assembly 15. This front discharge feature, in combination with the cab offset feature, has many advantages including a high visibility profile and better driver control at discharge centers where lower turn-around times would result as compared with conventional rear loading and rear ejection trash and garbage trucks.

During a waste loading operation, all of the upper portion of container opening 16 is closed by means of plate 24*b* secured upon frame unit 24 and by means of plate 34. The lower end of plate 34 is pivotally secured as at 34*a* to the free end of unit 32, the upper portion of said plate being slidably mounted in guideways 35 secured to frame unit 24. By so mounting plate 34, the restricted discharge opening at the convergent end of units 26 and 32 may vary in size while maintaining the remainder of the container opening 16 closed.

The hydraulic rams 28, 29 and 66 for lifting units 24, 26 and 30 respectively, as well as the accessories 82, 88 and 105, may be controlled from driver cab 114 by conventional means, not shown.

It will be observed in FIGS. 2, 14, 15 and 16 that the driver cab 114 is mounted upon the free end of a laterally swingable support 117 consisting of a cab-supporting arm 118 at one end and forked arms 119 and 120 at the other, the last two of said arms being pivotally secured to chassis 11 about vertically alined pins or shafts 122 and 123 respectively. The bottom of cab 114 is anchored to the upper end of a vertically disposed shaft 121 rotatably mounted in the arm 118.

The helper cab 115 is mounted upon a substantially opposite hand support 117' in a similar manner, said arm 117' also having forked arms 119' and 120' pivotally secured to the chassis 11 as at 122' and 123' and a helper cab support arm 118' (FIGS. 1, 11, 17 and 18).

The supports 117 and 117' each are provided with a chain and gear arrangement that keeps the associated cab oriented or facing in the same forward direction regardless of its laterally offset position. Since these arrangements are identical, only the arrangement for support 117 and driver cab 114 will be described, and like reference numerals with prime notations added will be applied to corresponding parts for the helper cab arrangement.

The orientation arrangement associated with support 117 and cab 114 (FIGS. 14–16) comprises sprocket 124 fixedly secured on shaft 121, said sprocket having a chain 125 mounted thereon and also on a sprocket 126, the latter sprocket being fixedly secured on vertically disposed rotatable shaft 127. On the upper end of shaft 127 is fixedly secured a sprocket 128 upon which a chain 129 is mounted, said chain being also mounted upon a sprocket 130 concentric with pivot pin 122. Sprocket 130 is non-rotatable and fixedly secured to chassis 11 as at 131 by welding or the like. Suitable slack adjusting devices 133 and 134 are employed in association with each of the chains 125 and 129.

From the above-described arrangement, it will be observed that as cab 114 is bodily swung laterally through any angle, the cab will simultaneously rotate reversely with shaft 121 through the same angle to thereby maintain the front face of the cab in parallel forward-facing positions.

Figures 14, 15, 16:
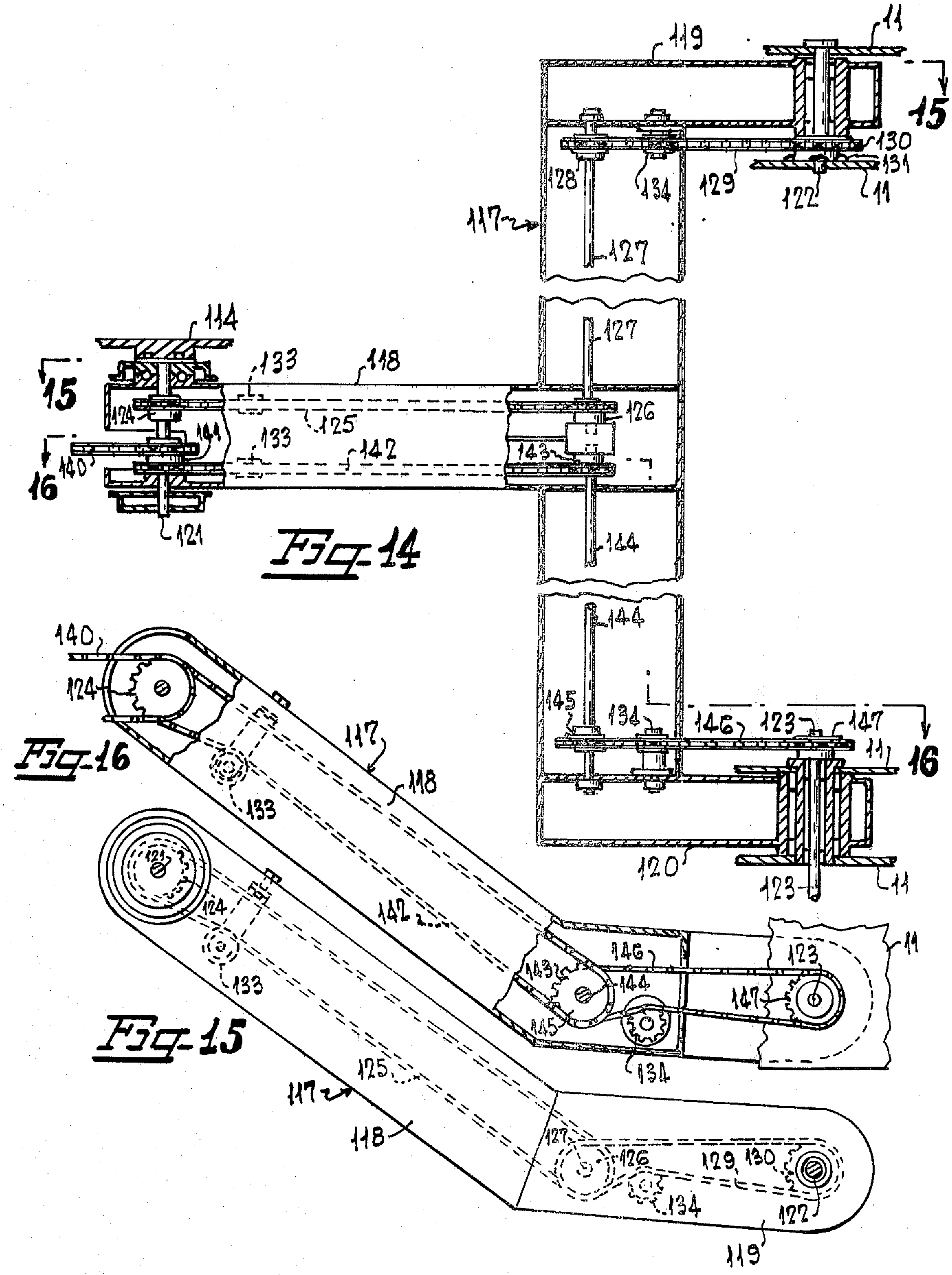
FIG. 14 is an enlarged sectional view of the driver cab support arm, the elevation of which is shown in FIG. 2, said view showing details of the cab orientation mechanism and of the steering control mechanism.
FIG. 15 is a sectional plan view taken along line 15—15 in FIG. 14.
FIG. 16 is a sectional plan view taken along line 16—16 in FIG. 14.
Figure 17:
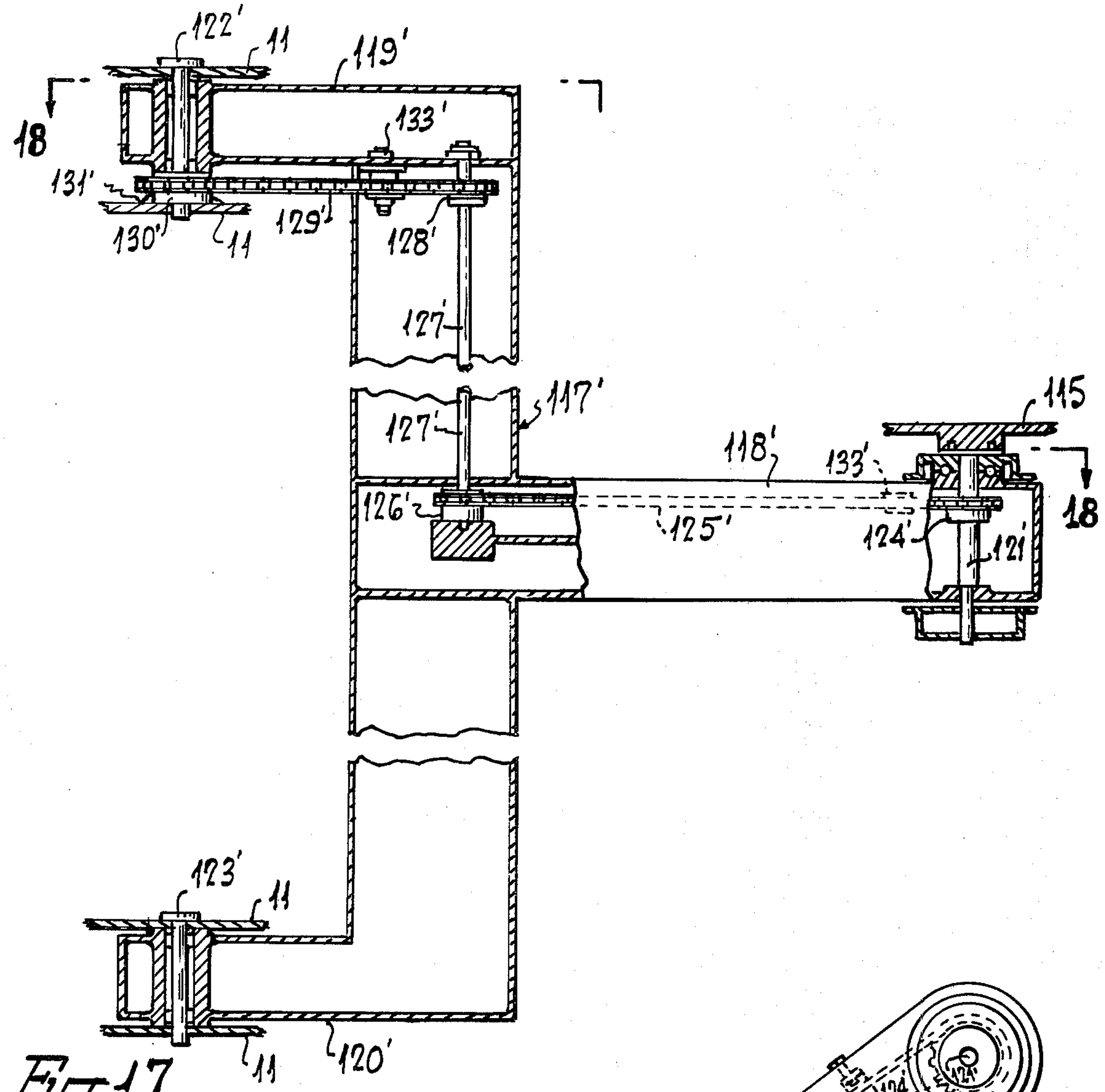
FIG. 17 is an enlarged sectional view of the helper cab support arm, the elevation of which is shown in FIGS. 1 and 3.
Figure 18:
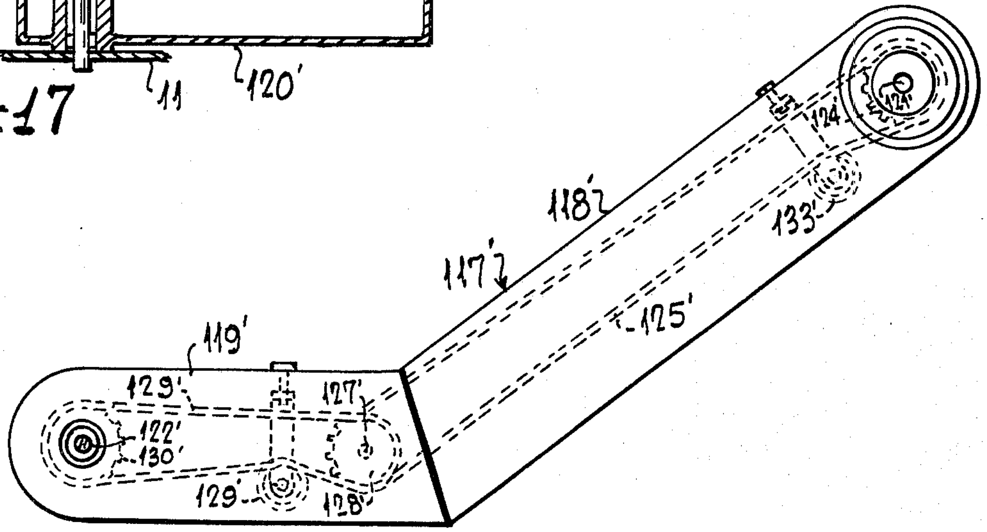
FIG. 18 is an enlarged sectional view taken along line 18—18 in FIG. 17.

Direct steering of the vehicle from the driver cab 114 is available in normal as well as cab offset positions by means of a chain and sprocket connection between the steering column 136 and the wheels 138 (FIGS. 2, 14 and 16). More specifically, this connection consists of a sprocket 139 at the base of column 136, said sprocket having a chain 140 mounted thereon and also mounted on one section of a twin sprocket 141 loosely mounted upon shaft 121. A chain 142 is mounted upon the other section of twin sprocket 141 and also on a sprocket 143 fixed upon vertical shaft 144, said shaft 144 having a sprocket 145 fixedly secured thereon. A chain 146 connects sprockets 145 and 147, the latter sprocket being fixedly secured upon shaft 123 which, in turn, is operatively connected to any suitable conventional direction control unit 137 for the wheels 138.

Figure 19:
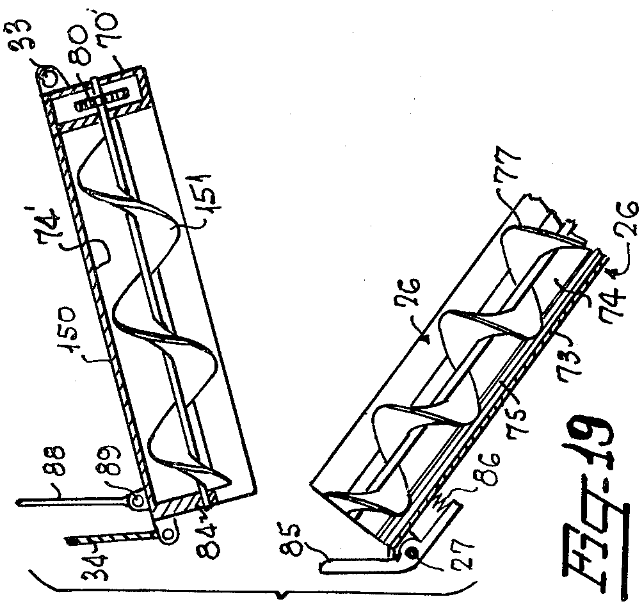
FIG. 19 is a schematic view similar to a portion of FIG. 7, but showing a modified form of the invention in which both convergent conveyors are the screw type.

In FIG. 19, a screw-type conveyor unit is substituted for the interfingered inverted unit 32, thereby employing two convergent screw-type conveyor units. The substitute unit is designated by reference numeral 150 and is comprised of one or more inverted channeled troughs 74' having screw or screws 151 mounted therein by means of gear box 70' at one end and a bearing 84 at the other end, the latter bearing being preferably narrow or streamlined so as to offer a minimum obstruction to the flow of the waste. The driving arrangement for unit 150 may be substantially the same as described for unit 26.

Although three conveyors 26, 30 and 32 are illustrated and described for use in mechanically loading waste material from the street level, it is to be understood that the invention contemplates manual loading as well. For example, the interfingered lowermost unit 30 may be rendered inoperative or entirely eliminated when manual loading only is contemplated while retaining the two convergent conveyors 26 and 32, or 26 and 150, which constitute critical features of the invention.

I claim:

1. In a waste pickup and ejecting vehicle having a waste container with an opening therein at the front of said vehicle, and means in said container for ejecting waste through said opening, the combination of a waste-receiving channelled ramp having its upper end communicating with the lower portion of said opening and its lower end extending forwardly of the latter, means carried by said ramp for conveying waste upwardly thereof and into said opening, a forward-facing driver cab positioned above the communicating end of said ramp and in front of the upper portion of said opening; means for swinging said cab to a position to expose said opening; said means carried by said ramp for conveying waste comprising a plurality of screws disposed longitudinally of said ramp channels for thrusting said waste upwardly thereof, said screws being rotatable substantially in a common plane; additional means comprising a plurality of yieldably mounted parallel bars extending longitudinally relative to said ramp for movement toward and away from said screws, said bars each being bodily rotatable in a plane disposed at right angles to said common plane, and means for rotating alternate bars successively into engagement with said waste to thrust the latter upwardly toward said opening whereby a convergent thrust is produced to supplement the upward thrust of said screws.

2. A vehicular pickup mechanism as defined in claim 1 wherein said ramp comprises at least one pair of parallel troughs, and wherein said screw means comprises a pair of oppositely pitched screws respectively mounted in said troughs.

3. A vehicular waste pickup mechanism as defined in claim 2 and further comprising means for rotating said oppositely pitched screws in opposite directions to center the waste material above and between the screws as it is conveyed longitudinally by said screws.

4. A vehicular pickup mechanism as defined in claim 1 and further comprising means for collecting and delivering waste to the lower portion of said ramp and associated screw means, said collecting and delivering means also including a plurality of parallel fingers each bodily rotatable in a plane disposed at right angles to said common plane, and means for rotating alternate fingers of said collecting and delivering means successively into engagement with said waste to collect and transfer it to said ramp.

5. A waste pickup and ejecting vehicle as defined in claim 1 and further comprising means for swinging said ramp upwardly to expose said opening when said cab is in its position to expose said opening.

6. A waste pickup and ejecting vehicle as defined in claim 1 and further comprising means operable from said swingable cab for steering said vehicle.

* * * * *